Jan. 21, 1936. M. S. HALL Re. 19,833
COMBUSTION CHAMBER HEATING DEVICE
Original Filed Aug. 26, 1932 2 Sheets-Sheet 1
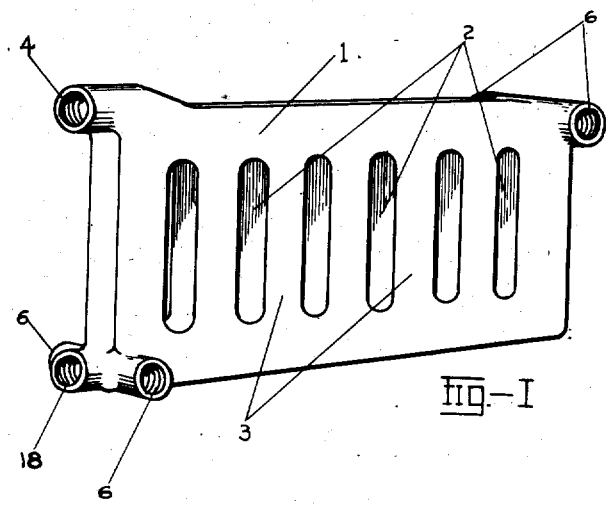
Fig.-I
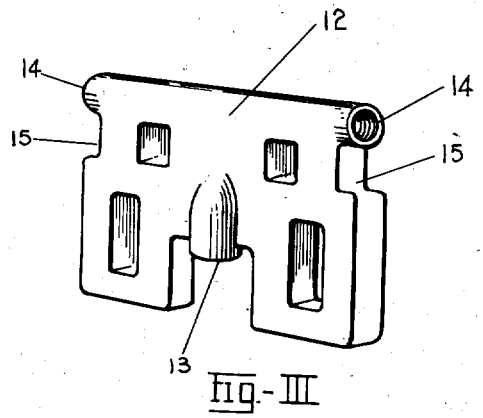
Fig.-III
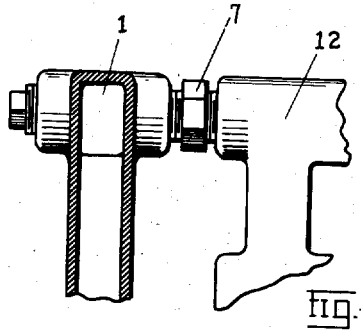
Fig.-IV
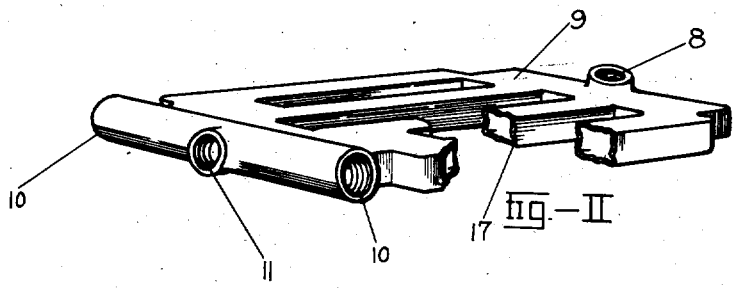
Fig.-II
INVENTOR.
Moses S. Hall
BY
Myron L. Hill
ATTORNEY.

Jan. 21, 1936. M. S. HALL Re. 19,833
COMBUSTION CHAMBER HEATING DEVICE
Original Filed Aug. 26, 1932 2 Sheets-Sheet 2
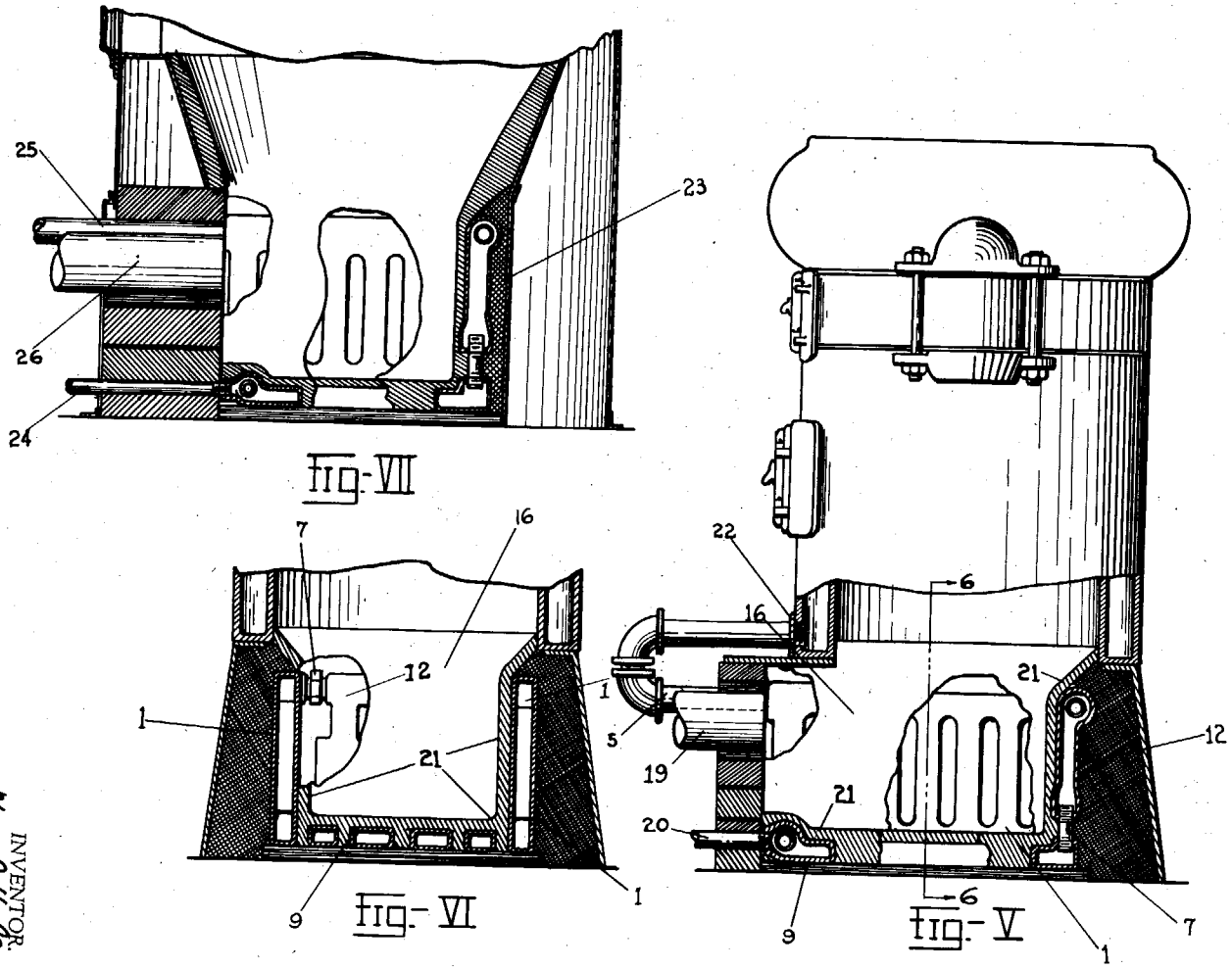
FIG. V
FIG. VI
FIG. VII
INVENTOR.
Mon S. Hall
BY
Myron L. Hill
ATTORNEY.

Reissued Jan. 21, 1936

Re. 19,833

UNITED STATES PATENT OFFICE 19,833

COMBUSTION CHAMBER HEATING DEVICE

Mora S. Hall, Baltimore, Md., assignor to May Oil Burner Corporation, a corporation of Maryland Original No. 2,001,721, dated May 21, 1935, Serial No. 630,543, August 26, 1932. Application for reissue June 28, 1935, Serial No. 28,981

11 Claims. (Cl. 122—210)

This invention relates to heating devices and has particular application to the type of boilers designed for house heating which usually operate under low pressure.

Among the objects of this invention is the provision of a quick-heating boiler, of the low pressure type, for household use which is adapted for operation with fluid fuel and which will function with greater fuel economy than the devices heretofore employed.

A further object of this invention is the provision of a boiler such as is heretofore described wherein the fire pot has a coating of plastic refractory material, said coating being of adequate thickness to absorb heat and to radiate heat back to the flame of the burner and sufficiently thin to transfer heat therethrough to the fluid to be heated within the boiler.

More specifically, it is an object of this invention to provide a quick-heating water compartment comprising side, rear and bottom hollow wall sections. This quick-heating water compartment, which has the plastic refractory coating material and is independent of but connected for circulation with the boiler, forms the larger part ofthe walls of the fire pot.

A still further object of this invention consists in providing means whereby a boiler designed for operation with solid fuel may be readily converted into a boiler using fluid fuel, and which by my invention has its heating surface increased.

The advantages of liquid fuel over coal, particularly in domestic heating, are generally conceded and understood. With my new quick-heating water compartment a considerable saving of the heating value of the fuel heretofore lost is achieved and this results in a greater fuel economy or an increased capacity of the heater or both. My new quick-heating water compartment may also be advantageously employed with continuously burning and other liquid or gaseous fuel burners and especially with automatically controlled, intermittently operated burners, that is, with burners in which the flame burns intermittently under control of automatic regulating devices which cause it to burn and to cease burning as called for by such control devices. With my new construction there is effected a reduction of radiation losses through the walls as well as the heat losses to the ground beneath incident to other types of combustion chambers or fire pots.

In furnaces in which the base portion is not supplied with water backing in which liquid or gaseous fuel is used and where refractory combustion chambers are advantageous, it reduces the amount of refractory necessary, thus reducing the heat loss due to the thermal capacity of such material. Where an intermittent type oil burner has been installed in a boiler provided with my new quick-heating water compartment, the ash pit of the boiler is now transformed into fire pot which is lined with refractory reaching to about the former level of the grate, which now has been removed. The losses due to heat absorbed by the thick refractory linings hertofore employed and dissipated during the shut down period, due to the heat passing out of the heater into the chimney, are minimized by the use of a thin lining of refractory material as embodied in my invention. Also, heretofore, frequently oil dripping by leakage into the refractory lined combustion chamber or entering therein by other means has been the cause of serious explosions in heaters by reason of the high temperature of the refractory lining at shut down or upon the starting up of the burner, when the automatic devices have caused the burner to operate and the oil vapors previously formed in the hot combustion chamber and mixed with air to ignite and explode, causing great damage. In my invention the thickness of the refractory wall in the ash pit section is greatly reduced. The thin refractory material heats up more quickly and also cools more quickly. The quick cooling of the refractory material prevents explosions described above in the case of residual oil or oil accidentally or irregularly entering the combustion chamber thus greatly reducing the fire hazard and the danger from explosions or so called puffs of igniting residual gases.

The heat absorbing surfaces in contact with the refractory lining add to the heating capacity and are a source of economy and by reason of the thinness of the refractory wall cause more prompt heat transfer to the heating medium within the quick-heating water compartment. The quick passage of heat into the heating medium circulating through the hollow wall sections of my invention materially shortens the time required to develop full load conditions in the heating system. The heavy refractory lining, usually built into the ash pit space in such heaters, is replaced by the hollow wall sections of my invention, which line more or less completely the ash pit space or lowest portion of the heater, these hollow wall sections being preferably coated as hereinbefore stated with a comparatively thin layer of refractory. Heat from the flame and the hot gases is absorbed by this refractory which is cemented firmly to the hollow wall sections thru which the heating medium circulates and by which it is absorbed, the heater water passing on into the heater boiler proper.

The hollow wall sections of my invention may be connected with the return line or directly into the boiler at low and high points providing circulation or the connections of the said sections may be entirely independent of the main heating system. I am aware that boilers have been designed with integral water legs and that cook stoves and ranges have been equipped with water back devices for hot water supply and for heating purposes. Also, that water walls have been used in large boilers to keep refractory linings from melting. I am further aware that hot air heating furnaces have been equipped with various devices for heating a water supply and for heating purposes. My invention, however, has for its objects, in the case of hot water or steam heating boilers, to increase the heating capacity of the heater, to provide a quick heating device, shortening the period required to attain to full load conditions, and to eliminate the hazard of explosions or so called gas puffs in the combustion chambers of fluid burning heaters, while at the same time to maintain during the operating period of the burner, a sufficiently high temperature to assure adequate combustion of the fuel.

The accompanying drawings show my invention in its preferred form and its application to a boiler such as is frequently met with in household heating plants and in which an oil burner of the pressure atomizing type is installed. However, I do not limit myself to its use in such boilers or with such burners, because it may be applied to any of the types or styles of boilers or heaters in common use, in connection with gaseous or with liquid fuel burners and may also be applied to hot water heating plants or to heaters for industrial use under like conditions.

In the drawings:—

Fig. I is a perspective view of a cast iron hollow side wall section.

Fig. II is a perspective view of a hollow bottom wall section, a portion being broken away to show its construction.

Fig. III is a perspective view of a hollow rear wall section.

Fig. IV is a fragmental view, partly in elevation and partly in section, of the joint by which the hollow wall sections are connected, and illustrating the use of a right and left hand nipple.

Fig. V is a side elevation of a boiler showing the relation of the hollow wall sections to the heater and to the windpipe of an oil burner, part of the device being broken away to illustrate the construction.

Fig. VI is a fragmental vertical section taken along line 6—6 of Fig. V.

Fig. VII is a fragmental view, partly in section, of a hot air furnace showing the disposition of the hollow wall sections with respect to the heater and to the windpipe of an oil burner.

The side wall section 1 of the quick-heating water compartment is cast hollow with thin walls and provided with the openings 2, thereby forming the columns 3 which will contain water when the apparatus is filled. A boss 4 at one corner of the wall section is internally threaded to receive an outlet pipe 5 (shown in Fig. V). The water inlet connection may be made through the internally threaded opening 18, but is preferably made through the bottom wall section at the bosses 10 shown in Fig. II. The hollow section is provided with other bosses 6 which are internally threaded and permit ready connection with other hollow sections of the quick-heating water compartment by means of the right and left hand nipples 7. The location of the bosses on this hollow wall section as well as those on the other hollow wall sections may be varied to meet the particular requirements of the installations and connections. Any threaded openings not serving for connecting one hollow wall section with the other may be sealed with suitable pipe plugs.

The bottom wall section 9 of the quick-heating water compartment, illustrated in Fig. II, is provided with the two internally threaded bosses 10 which permit connection with the hollow side wall sections. The inlet opening 11 is for direct connecting of the water inlet to this bottom hollow section. Any or all of these inlets may be used. The construction of this bottom wall section is similar to that of the side wall section, and has thin walls 17 and openings as shown. The boss 8 is suitably threaded for a right and left hand nipple to connect the bottom wall section with the rear section 12 shown in Fig. III. The nipple 7 fits into the threaded hole in the boss 13 in the cutaway portion of the rear wall section 12 of the quick-heating water compartment. The details of construction of the rear section 12 are similar to those shown for the other hollow wall sections. Connections to the side sections are preferably made by means of the threaded bosses 14, in which the right and left hand nipples 7 are screwed, the chambers being cut away at 15 to facilitate connection. In this manner the sections are joined in series to form a part of a fluid circulation system through a water lined fire pot construction. The return or outlet 5, shown in Fig. V, extends from both side wall members to the return inlet 22.

The faces of the side, rear and bottom hollow wall sections that are to be exposed to the fire are coated with a layer of plastic refractory material 21 of adequate thickness to absorb heat and to radiate heat back to the flame of the burner and sufficiently thin to properly transfer heat therethrough to the heating medium in the water lining.

The manner of connecting the hollow wall sections of the quick-heating water compartment and the disposition of the cutaway portions of these sections which facilitate their connection to each other, may be varied to meet the requirements of the installation. If desired, the right and left hand nipples may be replaced by tapered push nipples, the corresponding bosses being suitably taper-bored.

When my invention is to be applied to a boiler originally designed for solid fuel burning, the hollow wall sections of the quick-heating water compartment are assembled within the part 16 formerly serving as the ashpit of the boiler, and form the fire pot as shown in Figs. V and VI. The boiler may now be used as an oil fuel burner, wherein the portion 19 serves as the wind pipe of the oil burner (not shown in the drawings).

When my invention is applied to a hot water heating boiler, as illustrated in Fig. V, the hollow wall sections serve as an auxiliary quick-heating water compartment which co-operates with the main water compartment, the water inlet to the quick-heating water compartment being through the pipe 20 and the heated water from this auxiliary quick-heating water compartment passes into the main water compartment.

If my invention is applied to a hot air heater, as shown in Fig. VII, which has been converted from a solid fuel burner to a fluid fuel burner, the hollow wall sections are positioned in the part 23 formerly constituting the ashpit portion of the heater and serve as a quick-heating water compartment, the water entering through the pipe 24 and discharging through the pipe 25. In this construction 26 represents the wind pipe of an oil burner (not shown in the drawings). In hot air heaters, whether originally constructed as a fluid fuel burner and provided with one of my new quick-heating water compartments or converted from a heater originally made for solid fuel burning as shown in Fig. VII, the inlet pipe 24 may be connected directly with a water supply line and the outlet to a hot water supply storage tank. Also, the inlet 24 may, if desired, be connected with an auxiliary hot water heating system return and the outlet 25 to the water heating system, the water system under these conditions serving as an auxiliary to the hot air system.

Heat from the combustion of the fuel is absorbed by the refractory material and conducted to the water in the hollow wall sections. These sections are filled with water which absorbs the heat and a rapid circulation is started. By this means, the heat absorbed by the refractory is used in heating the return water and increases the economy of operation. With a construction as shown in Fig. V, the rapid circulation of water through the quick-heating water compartment and thence into the main water compartment materially shortens the time required to bring the boiler up to full load conditions.

If desired, two or more of the side, rear and bottom hollow wall sections of the quick-heating water compartment may be made integral with each other, wherever the installation will permit, thus dispensing with the connections between these hollow wall sections. The openings 2 in the side wall sections and the corresponding openings in the other wall sections afford better bonding of the plastic refractory material to the hollow wall sections.

By using my new construction, greater heating surface is provided, which heating surface area is even more than proportionately effective and is accompanied by an increase in the capacity and efficiency of the boiler. This admits of effecting a substantial increase in the capacity and load of existing boilers by merely installing my new device therein.

It has been found that proper combustion is maintained only when the temperature of the flame of the oil burner is kept sufficiently high to insure complete combustion. In employing thick refractory lining, a considerable mass of refractory material must be heated and maintained at the high temperature, thus not only entailing an initial diversion of much heat, but the maintenance of this large mass of refractory material at the high temperature causes objectionable heat losses due to dissipation of heat and particularly is this the case in the intermittent type of firing where the heat taken up by the refractory material passes away without rendering useful service during the off period. Furthermore, refractory material of such thickness interferes with and delays too greatly the transfer of heat to the water in the jacket, thereby rendering the apparatus inapt as a quick or rapid heater.

My invention is of particular value with the type of oil burners producing a luminous flame and where it is desirable that all of the combustion takes place before the products of combustion leave the chamber surrounded by the water jacket. Otherwise, proper efficient heating will not take place and, more seriously, the combustion itself will be unsatisfactory, incomplete and uneconomical. By the use of my quick-heating water compartment lined with refractory material of proper thickness, as specified herein, the desirable effects are produced. My invention is a construction wherein there results simultaneously quick heating, considerable reduction in normal heat losses, and complete combustion of fuel with a luminous flame with practically complete elimination of products of incomplete combustion that form accumulations of deposits of soot and tarry material.

I claim:

1. In a house heating device, a fire pot; a fluid fuel burner; a fluid heating compartment; a chamber in communication with said fire pot for directing hot gases of combustion against said compartment, a water lining for said fire pot, comprising a floor section and a separate wall section extending upwardly from said floor section, said floor section and said wall section being connected together for fluid circulation and to a fluid chamber and a coating of refractory material applied to said floor and wall sections, said coating being of adequate thickness to absorb heat from and to radiate heat back to, the flame of the burner and sufficiently thin to transfer heat therethrough to the fluid in said floor and wall sections.

2. In a house heating boiler, a water compartment, a fire pot, a fluid fuel burner in said fire pot, a water lining for said fire pot comprising a vertical wall section and a separate bottom wall section, said wall sections and said water compartment being connected together for fluid circulation, and a coating of plastic refractory material attached to said wall sections, said coating being of adequate thickness to absorb heat and to radiate heat back to the flame of the burner and sufficiently thin to transfer heat therethrough to the fluid in the wall sections.

3. In a house heating device, a boiler, a water compartment, a fire pot, a fluid fuel burner, a water lining for said fire pot comprising a vertical wall section and a separate bottom wall section, said wall sections and said water compartment being connected together for fluid circulation, and a coating of plastic refractory material applied to said wall sections, said coating being of adequate thickness to absorb heat and to radiate heat back to the flame of the burner and sufficiently thin to transfer heat therethrough to the fluid in the wall sections.

4. In a low pressure boiler, a water compartment, a fire pot, a fluid fuel burner, a water lining for said fire pot comprising a floor section and a separate wall section extending upwardly from said floor section, said water compartment, floor section and wall section being connected together for fluid circulation, and a coating of plastic refractory material fixed to said floor section and wall section, said coating being of adequate thickness to absorb heat and to radiate heat back to the flame of the burner and sufficiently thin to transfer heat therethrough to the fluid in the floor section and wall section.

5. In a low pressure boiler, a water compartment, a fire pot, a fluid fuel burner, a water lining for said fire pot comprising a floor section and wall sections separate from and extending upwardly from said floor section, said water compartment, floor section and wall sections being connected together for fluid circulation, and an adherent coating of plastic refractory material applied to said floor section and wall sections, said coating being of adequate thickness to absorb heat and to radiate heat back to the flame of the burner and sufficiently thin to transfer heat therethrough to the fluid in the floor section and wall sections.

6. In a low pressure boiler, a water compartment, a chamber for directing combustion gases against said water compartment, a fire pot in communication with said chamber, a fluid fuel burner, a water lining for said fire pot comprising a floor section and a separate wall section extending upwardly from said floor section, said water compartment, floor section and wall section being connected together for fluid circulation, and an adherent coating of molded plastic refractory material applied to said floor section and wall section, said coating being of adequate thickness to absorb heat and to radiate heat back to the flame of the burner and sufficiently thin to transfer heat therethrough to the fluid in the floor section and wall section.

7. In a low pressure boiler, a water compartment, a chamber for directing combustion gases against said water compartment, a fire pot in communication with said chamber, a fluid fuel burner in said fire pot, a water lining for said fire pot comprising a floor section and a separate wall section extending upwardly from said floor section, said water compartment, floor section and wall section being connected together for fluid circulation, and a coating of plastic material bound to said floor section and wall section, said coating being refractory, of adequate thickness to absorb heat and to radiate heat back to the flame of the burner and sufficiently thin to transfer heat therethrough to the fluid in the floor section and wall section.

8. In a house heating device, a fire pot, a fluid fuel burner, a water lining for said fire pot comprising a vertical wall section and a separate bottom wall section, said wall sections being connected together for fluid circulation therethrough, a coating of plastic refractory material applied to said wall sections, said coating being of adequate thickness to absorb heat and to radiate heat back to the flame of the burner and sufficiently thin to transfer heat therethrough to the fluid in the said wall sections and an outlet and an inlet to said water lining adapted for connection with a hot water heating system in circulation relation.

9. In a house heating device, a fire pot, a fluid fuel burner, a water lining for said fire pot comprising a vertical wall section and a separate bottom wall section, said wall sections being connected together for fluid circulation therethrough, a coating of plastic refractory material applied to said wall sections, said coating being of adequate thickness to absorb heat and to radiate heat back to the flame of the burner and sufficiently thin to transfer heat therethrough to the fluid in the said wall sections, an inlet to said water lining adapted for connection with a source of water supply and an outlet adapted for connection to a hot water supply system.

10. In a house heating device, a fire pot; a fluid fuel burner; an air heating compartment; a chamber in communication with said fire pot, for directing hot gases of combustion against said compartment; a water lining for said fire pot comprising a floor section and a separate wall section extending upwardly from said floor section, said floor section and said wall section being connected together for fluid circulation, said water lining provided with an inlet and an outlet adapted for connection to an auxiliary hot water building heating system, and a coating of refractory material applied to said floor and wall sections, said coating being of adequate thickness to absorb heat from, and to radiate heat back to, the flame of the burner and sufficiently thin to transfer heat therethrough to the fluid in the said floor and wall sections.

11. In a house heating device, a fire pot; a fluid fuel burner; an air heating compartment; a chamber in communication with said fire pot, for directing hot gases of combustion against said compartment; a water lining for said fire pot; comprising a floor section and a separate wall section extending upwardly from said floor section, said floor section and said wall section being connected together for fluid circulation, said water lining provided with an inlet adapted for connection with a source of water supply and an outlet adapted for connection to a hot water supply system, and a coating of refractory material applied to said floor and wall sections, said coating being of adequate thickness to absorb heat from, and to radiate heat back to, the flame of the burner and sufficiently thin to transfer heat therethrough to the fluid in the said floor and wall sections.

MORA S. HALL.